(12) United States Patent
Krasser et al.

(10) Patent No.: US 8,775,619 B2
(45) Date of Patent: Jul. 8, 2014

(54) WEB HOSTED SECURITY SYSTEM COMMUNICATION

(75) Inventors: Sven Krasser, Atlanta, GA (US); Dmitri Alperovitch, Atlanta, GA (US); Martin Stecher, Paderborn (DE); Peter Borgolte, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 167 days.

(21) Appl. No.: 12/987,730

(22) Filed: Jan. 10, 2011

(65) Prior Publication Data
US 2012/0047259 A1 Feb. 23, 2012

Related U.S. Application Data

(60) Provisional application No. 61/374,495, filed on Aug. 17, 2010.

(51) Int. Cl.
G06F 15/173 (2006.01)
(52) U.S. Cl.
USPC .......................................... 709/225
(58) Field of Classification Search
USPC ................... 709/223, 225; 710/200; 711/150; 726/1–36
See application file for complete search history.

(56) References Cited

U.S. PATENT DOCUMENTS

| | | | |
|---|---|---|---|
| 7,574,738 B2 * | 8/2009 | Daude et al. ..................... 726/15 |
| 7,908,649 B1 * | 3/2011 | Arora et al. ....................... 726/7 |
| 2002/0165971 A1 * | 11/2002 | Baron ........................... 709/228 |
| 2003/0158889 A1 * | 8/2003 | Massarani et al. ............ 709/203 |
| 2004/0002962 A1 * | 1/2004 | Banerjee et al. .................. 707/3 |
| 2004/0064327 A1 * | 4/2004 | Humenansky et al. ........... 705/1 |
| 2004/0117278 A1 * | 6/2004 | Dutta et al. ...................... 705/34 |
| 2006/0080646 A1 * | 4/2006 | Aman ............................ 717/143 |
| 2006/0235940 A1 * | 10/2006 | Boutroux et al. .............. 709/217 |
| 2007/0061462 A1 * | 3/2007 | Kim et al. ....................... 709/226 |
| 2007/0094388 A1 * | 4/2007 | Talanis et al. ................. 709/224 |
| 2007/0136477 A1 * | 6/2007 | Bryce et al. .................... 709/227 |
| 2008/0066020 A1 * | 3/2008 | Boss et al. ..................... 715/968 |
| 2008/0086524 A1 * | 4/2008 | Afergan et al. ................ 709/202 |
| 2008/0091767 A1 * | 4/2008 | Afergan et al. ................ 709/202 |
| 2008/0263135 A1 * | 10/2008 | Olliphant ....................... 709/203 |
| 2009/0249440 A1 * | 10/2009 | Platt et al. .......................... 726/1 |
| 2010/0049850 A1 * | 2/2010 | Nanduri et al. ................ 709/225 |
| 2010/0064353 A1 * | 3/2010 | Kan et al. ............................ 726/5 |
| 2010/0120361 A1 * | 5/2010 | Rappaport ...................... 455/18 |
| 2010/0146110 A1 * | 6/2010 | Christensen et al. ......... 709/224 |
| 2010/0242106 A1 * | 9/2010 | Harris et al. ..................... 726/15 |
| 2011/0219057 A1 * | 9/2011 | Scoda ............................ 709/203 |
| 2011/0219109 A1 * | 9/2011 | Zehavi et al. ................. 709/223 |
| 2011/0276627 A1 * | 11/2011 | Blechar et al. ................ 709/203 |
| 2012/0047259 A1 * | 2/2012 | Krasser et al. ................ 709/225 |

OTHER PUBLICATIONS

Joon S. Park and Ravi Sandhu, Secure Cookies on the Web, 2000, IEEE Internet Computing, Jul.-Aug. 2000, pp. 36-44.*

* cited by examiner

*Primary Examiner* — Jason K. Gee
*Assistant Examiner* — Sanchit Sarker
(74) *Attorney, Agent, or Firm* — Wong Cabello Lutsch Rutherford & Brucculeri LLP

(57) ABSTRACT

A distributed proxy server system is operable to receive a request for Internet data from a user, obtain the user's identity, store at least one cookie on the user's web browser identifying the user, and filter undesired content before forwarding requested Internet data to the user. A master cookie is associated with the proxy server including user identity information, and an injected domain cookie is associated with the domain of the requested Internet data including user identity information.

20 Claims, 3 Drawing Sheets

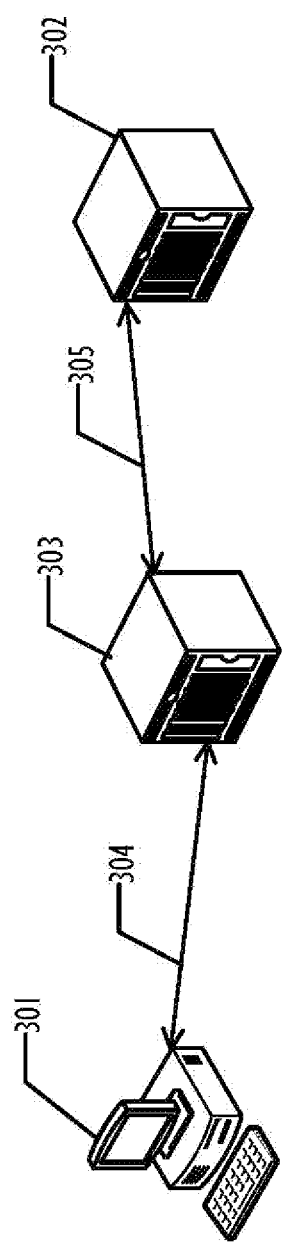

WEB HOSTED SECURITY SYSTEM COMMUNICATION

CLAIM OF PRIORITY

This application claims the benefit of priority under 35 U.S.C. §119(e) of U.S. Provisional Patent Application Ser. No. 61/374,495, entitled "WEB HOSTED SECURITY SYSTEM COMMUNICATION," filed on Aug. 17, 2010, the benefit of priority of which is claimed hereby, and which is incorporated by reference herein in its entirety.

FIELD OF THE INVENTION

The invention relates generally to computer security, and more specifically to communication in a web hosted security system,

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves ail other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or criminals to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, mass spam emails or emails having malicious content may be sent across the network, often from "zombie" computers taken over via. Trojans or other malware.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, email that can be recognized as spam or as malicious is often quarantined before it reaches a user's inbox, helping reduce the impact of undesirable email on the user.

Many such protective systems use signatures of known threats to detect and control the threat. For example, antivirus software typically uses a large library of signatures comprising code segments or other identifying information to scan storage such as hard drives and to scan executing programs, removing offending code from the computer system before it can cause damage. Email spam programs similarly search for common terms within the email suggesting the email may be spam, and quarantine the message rather than deliver it. More complex systems use a variety of more sophisticated analysis methods to determine the likely risk of various network communications.

Because these sophisticated methods can sometimes benefit from significant computing resources, or information relating to other network traffic, these protective systems sometimes rely on services provided over a network to better manage risk. Network-based services often monitor the perimeter of an entity's local area network, managing communications between the local network and the Internet. For example, a gateway computer system linking a business computer network to the Internet may scan for a variety of known threats such as viruses, malicious websites, and Trojan software, and may refer email, files, or programs that can't be locally scanned as safe or malicious to a web service for a final evaluation of the communication's risk. It may also restrict access to various websites, files, and other web content known or believed to pose a danger to end users.

It is therefore desirable to manage network-based security services to provide safe and effective security to networks.

SUMMARY

Some example embodiments of the invention comprise a computerized proxy server that is operable to receive a request for Internet data from a user, obtain the user's identity, store at least one cookie on the user's web browser identifying the user, and filter undesired content before forwarding requested Internet data to the user. In a further example, a master cookie is associated with the proxy server including user identity information, and an injected domain cookie is associated with the domain of the requested Internet data including user identity information.

BRIEF DESCRIPTION OF THE FIGURES

FIG. 3 shows a proxy server network environment with separate negotiation of compression between the proxy server and the user's computer and between the proxy server and the server providing requested Internet data, consistent with an example embodiment of the invention.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Some example embodiments of the invention comprise a distributed proxy server system that is operable to receive a request for Internet data from a user, obtain the user's identity, store at least one cookie on the user's web browser identifying the user, and filter undesired content before forwarding requested Internet data to the user. In a further example, a master cookie is associated with the proxy server including user identity information, and an injected domain cookie is associated with the domain of the requested Internet data including user identity information.

Figure 1:
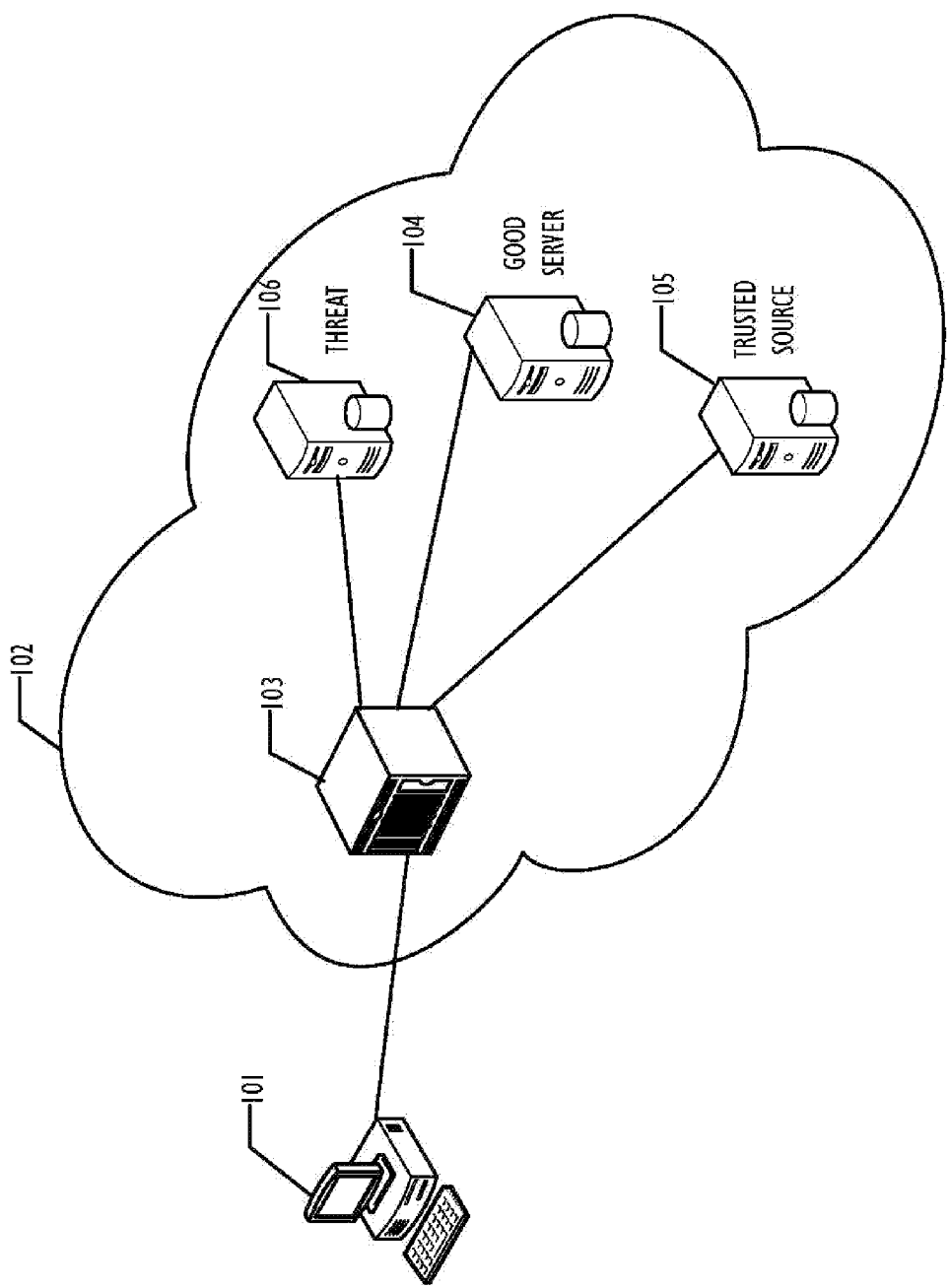
FIG. 1 shows a network environment, consistent with an example embodiment of the invention.

FIG. 1 illustrates a network computing environment, consistent with some example embodiments of the invention. Here, end user computers such as desktop computer 101 are coupled to the Internet 102, and via other computer systems 103 such as gateways, firewalls, servers, or other such systems, to various servers 104 providing a variety of content such as web pages, email, and other media to the user's computer 101. Some embodiments further include one or more security servers 105, such as a TrustedSource™ or other server, and one or more unknown or suspicious computer systems 106 connected to the network.

In a more detailed embodiment, computer system 103 is one of several computers that are operable to serve as a distributed proxy server system, and process any requests from computer 101 for data from the Internet 102 before forwarding the request to servers such as 104. This enables the proxy server to control or filter user 101's access to undesirable content on the Internet, such as Trojans or malware, pornography, or various other undesired content. A corporation may employ such a system to prevent its employees from downloading malicious or undesirable content from the Internet, or a school may use such a system to restrict student access to appropriate or approved content.

Here, the proxy server 103 receives a request for Internet content from a user 101, and performs authentication to determine user 103's identity. For example, the user may be required to log in to a proxy service, or may be authenticated by the network services of the user's corporation or other entity using login information already entered. The user's request for web information, such as a request for a specific web page, is then handled by the proxy server 103, and in some embodiments is filtered based on both the user's identity and the information requested.

For example, a law firm may choose to prohibit users from gossip or entertainment news sites, while a media organization may choose to permit the same sites. Similarly, an educational institution may choose to be much more permissive than a corporation that expects its systems to be used only for company business. The proxy server 103 uses the user's identity and knowledge of the user's organization as well as its knowledge of the dangers of various threats on the Internet to determine what requests to block from a dangerous source such as 106, and what requests to send on to a server such as 104. In a further embodiment, information regarding the relative dangers of various Internet data such as files, websites, or entails is provided by a server such as TrustedSource server 105.

But, a proxy server's ability to identify a particular computer or user is limited in many embodiments. It is common for computer systems within a corporation to have locally assigned IP addresses, but all appear to external systems to have the same IP address. The proxy server may store a cookie to identify a user's computer system once the user has logged in, but web browsers will only return cookies to the site that set the cookie, so the cookie only identifies the user's computer to the proxy server's login web pages. A user requesting another web page on the Internet will therefore not also send the proxy server's cookie identifying the user to the proxy server unless the requested page is again redirected to a proxy server web page.

Some embodiments of the invention seek to remedy this user identification problem for Internet-based proxy server security by using alternate methods of identification, such as a modified cookie-based authentication scheme.

Figure 2:
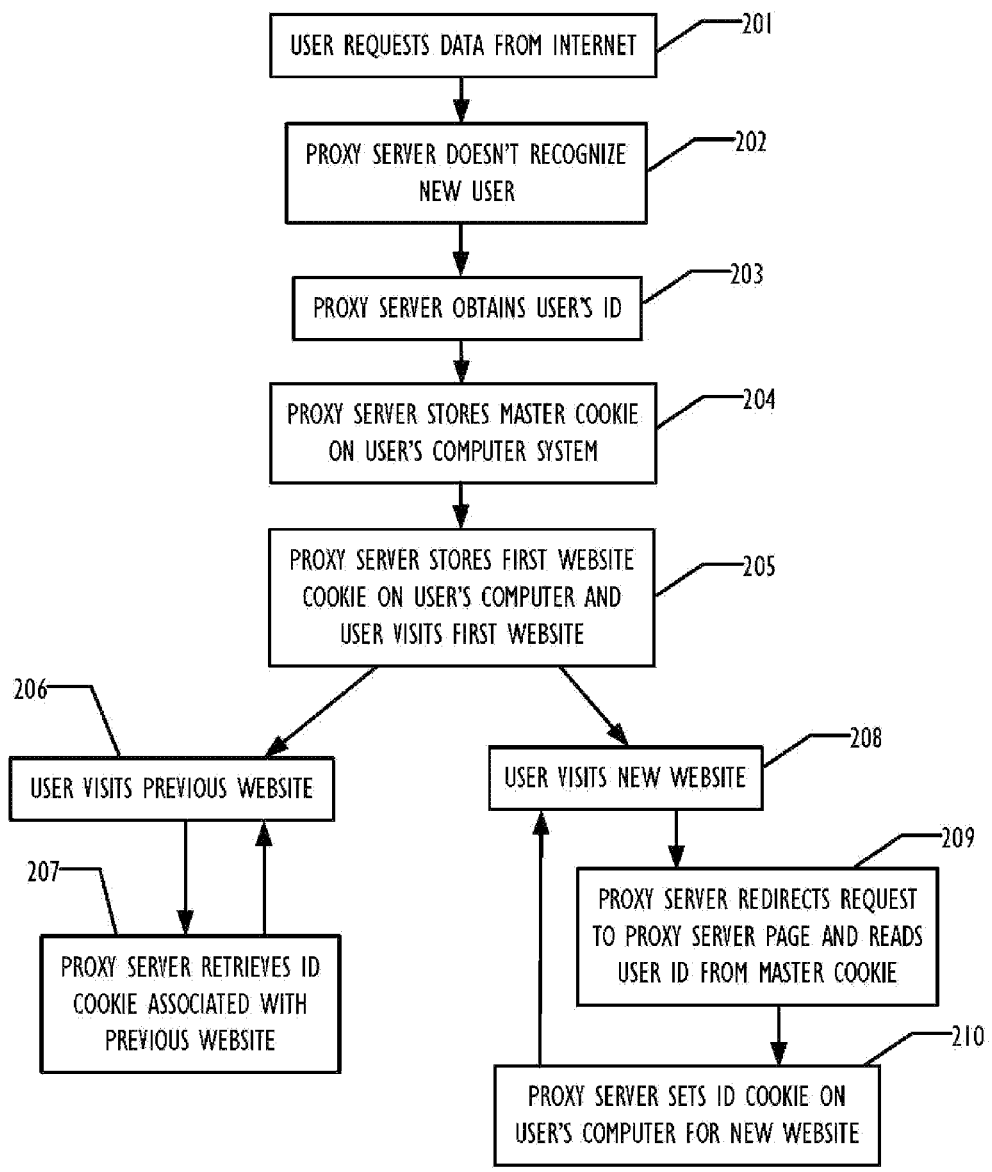
FIG. 2 shows a flowchart of a method operating a proxy server to store user identity information using cookies, consistent with an example embodiment of the invention.

In one such example shown in the flowchart of FIG. 2, a user 101 first requests data from the Internet, such as attempting to visit a first website, and a proxy server 103 recognizes that it can't identify the user at 202. This is in part because the user's individual IP address can't be discerned from outside the corporate network, and no cookie or other identifying information has been set at the user's system by the proxy server. The proxy server therefore obtains the user's ID at 203, such as by requiring the user to log in or by obtaining the user's ID via another mechanism.

The proxy server then stores a master cookie on the user's system identifying the user to the proxy server at 204. The master cookie is associated with a Web site that is part of the Web security service and can only be read when the user accesses this site. The service redirects the user then from the master cookie site to the actual destination (i.e., the first website). The service also includes authentication data derived from the master cookie in the URL. The proxy can detect this data in the URL, set a cookie on the user's system that is associated to the actual site the user is going to, and remove the extra data before relaying the request to the Web server the user is trying to visit. The proxy server therefore also stores a cookie on the user's system, the cookie associated with the actual website the user is attempting to visit at 205 and can inject the cookie into the response with the requested Internet information from the actual website such that the cookie appears to come from the domain of the requested Internet data.

The next time the same user attempts to visit the first website or any other previously visited website at 206, the proxy server has already set a cookie on the user's system, the cookie associated with that website and identifying the user. Although the set cookie is associated with the first (or previous) website rather than the proxy server, the proxy server is operating as a proxy for the first (or previous) website, and appears to the user's computer to be the first (or previous) website. The proxy server can therefore obtain the cookie information it previously stored associated with the first (or previous) website at 207, even though the browser will only return the cookie to a server it believes to be the website associated with the cookie. The proxy server therefore does not need to gather other authentication information, but can rely on the cookie it set previously to obtain the user's identity.

If the user visits a second (or new) website at 208, the proxy server redirects the request to the proxy server's security page which reads the master cookie, establishing the user's identity at 209. The proxy server then directs the request back to the second (or new) website, and sets an identity cookie associated with the second website at 210 on the user's system. This process repeats for as many websites as the user visits using the web browser, enabling the proxy server to quickly identify the user during subsequent visits to the same websites using the identity cookies the proxy server has stored on the user's system that is associated with each website. The identity cookie the proxy server sets for each visited website is used only by the proxy server, and is removed before the data request is forwarded to the actual website.

In another example, the identity of a particular user can be determined in the proxy server (such as at 203 of FIG. 2) without requiring the user to enter a username or password. If the request comes from an IP address that is known to be associated with a corporation or other environment that supports NT LAN Manager (NTLM) authentication in a Microsoft Windows environment, NTLM authentication can be used to initially establish the user's identity. The unauthenticated user identity information can be provided automatically via the user's web browser (major browser support this natively, others can be supported via plugins). NTLM is done at connection scope, so an additional connection to the proxy would normally require another NTLM round. This can be circumvented by injecting a cookie with authentication information into the connection, which can be read by subsequent connections for requests to the same domain (Web site). If the cookie is not found, a new NTLM round can be triggered to set it. Alternatively, the master cookie mechanism can be used instead of relying on another NTLM round.

Another mechanism used in some embodiments includes an identity provider that is operable to provide login or other identity information to the proxy server in place of presenting a user with a login page, such as a Security Assertion Markup Language (SAML) identity provider (IdP) comprising a part of the user's local network. In a further embodiment, the SAML identity server is used only to first identify the user to the proxy server, and set a master cookie for future use. Subsequent visits to new sites result in a redirect to the proxy server and retrieval of the master cookie such that an identity cookie can be set associated with the new website, providing faster identification than using the SAML authentication process for each new website.

SAMP IdP's are customer specific. To find the right SAML IdP, the external IP of the user connecting to the proxy service can be used. Alternatively, different customers can use different proxy IPs or proxy port so that the proxy service can distinguish them. Moreover, a browser plugin can be used to inject data that allows the proxy service to see which IdP is to be used. Lastly, NTLM can be used to transparently retrieve the domain name of the user, which can also be used to pick the right IdP.

Use of cookies the proxy server stores in association with third-party websites works in most cases, but can be problematic for some websites such as secure websites provided via https or other secure means. When a website-specific cookie can't be stored and retrieved for a website, a browser plugin or local service can be used that caches the master cookie and injects it into the request from the browser to the proxy to establish a secure connection.

Communication of web content via a proxy server to provide content filtering results in some added complexity relative to a direct Internet connection between a user and server, as shown in FIG. 1. The additional data handling performed in an environment using a proxy server results not only in a greater number of data transfers and higher complexity, but in additional opportunities for improving communication between systems in one embodiment.

FIG. 3 shows a simplified computer system comprising a user's computer 301, a server 302, and a proxy server 303.

The proxy server intercepts computer 301's requests for data from server 302, and processes data requests before selectively forwarding them to servers such as 302 to prevent undesired websites or other undesired data from being retrieved. The proxy server further examines the provided data before sending it to the user's computer 301, such as to prevent viruses or Trojans from being sent to the user.

Most web browsers support receiving compressed content, such as using deflate or similar algorithms to reduce the size of the data sent in response to a request. Similarly, data requests from the user can be compressed before being sent to other computers via the network, reducing the amount of network traffic needed to communicate between computers.

However, it is not uncommon for servers not to support compression. Similarly, some browsers such as stripped-down browsers on mobile devices do not support compression. Communication between a user's computer 301 and a server 302 typically includes negotiation of compression, based on the capabilities of the user's browser and the server such that compression will only be used if both the user's computer and server support the same compression.

Some embodiments of the invention therefore take advantage of the proxy server's position between the user's computer 301 and server 303 to provide for encryption or compression over some links of the communication path, even where both the server 302 and end user's computer 301 do not support compression or encryption. In a more detailed example, the proxy server intercepts the negotiation between computer 301 and server 302, indicating to each party that the other supports all compression/encryption methods supported by the proxy server 303.

For example, if the user 301 and proxy server 303 support compression, but the server 302 does not, link 304 will be compressed because the computers on each end of the link support compression. Link 305 will not be compressed because the server 302 does not support compression in this example, even though proxy server 303 has indicated to computer 301 that the server 302 supports compression so that the link between computer system 301 and proxy server 303 is compressed. Encryption could be handled in a similar manner as described for compression.

If neither the user's computer 301 nor the server 302 support compression, neither of links 304 and 305 will be compressed, whether or not compression is supported in proxy server 303. Similarly, if user computer 301 and server 302 both support a compression algorithm not implemented in proxy server 303, neither link will be compressed as the proxy server 303 examines the data to perform its filtering functions.

The proxy server 302 therefore enables compression to be supported over at least one link where both the proxy server and at least one other system support the same compression algorithm, reducing the amount of network traffic through the proxy server even if the computer system 301 and server 302 don't both support the same compression technology. Various features and functions described herein are embodied in various examples in modules or elements of a system that include hardware, software, user operation or input, or any combination thereof.

These examples illustrate how a proxy server such as a server or system of servers located outside a user's local network can be used to efficiently identify a user and filter undesirable Internet content before forwarding requested content to the user. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A distributed proxy server system, the system comprising:
   a web security service website;
   a proxy server, comprising:
   one or more processors; and
   a memory, wherein the memory stores instructions comprising instructions to cause the one or more processors to:
      receive a request at the proxy server from a client computer, the request for internet access to a first website;
      determine if a master cookie associated with user identification information is available to allow access to the website;
      perform authentication for a user associated with the request when no master cookie is available;
      create the master cookie associated with both the user identification information and the web security service website after performing the authentication;
      allow access to the first website via the proxy server by using the master cookie at the proxy server and relaying the request to the first website;
      create a second cookie that is associated with the first website, the second cookie having information for the first website and additional identity information provided by the distributed proxy server system redirecting to the first website;
      inject the second cookie into a response to the client computer along with the response from the first website such that the second cookie appears to the client computer to come from domain of the first website, the second cookie in the response to the client computer containing the additional identity information; and
      remove the additional identify information from the second cookie by the proxy server prior to relaying the request to the first website.

2. The distributed proxy server system of claim 1, wherein the instructions further comprise instructions to cause the one or more processors to:
   receive a request to access a second website, the second website in a different domain than the first website;
   utilize the master cookie and create a third cookie that is associated with the second website; and
   allow access to the second website using the third cookie.

3. The distributed proxy server system of claim 1, wherein the instructions to cause the one or more processors to perform authentication comprise instructions to cause the one or more processors to obtain an identity of the user via the user completing a logon process.

4. The distributed proxy server system of claim 1, wherein the instructions to cause the one or more processors to perform authentication comprise instructions to cause the one or more processors to obtain an identity of the user via an NT LAN Manager (NTLM) authentication process.

5. The distributed proxy server system of claim 1, wherein the instructions to cause the one or more processors to perform authentication comprise instructions to cause the one or more processors to obtain an identity of the user via a Security Assertion Markup Language (SAML) identity provider.

6. The distributed proxy server system of claim 1, wherein the instructions further comprise instructions to cause the one or more processors to send the master cookie and the second cookie to a web browser on the client computer making the request.

7. The distributed proxy server system of claim 1, wherein future requests for internet access to the first website are serviced using the second cookie and not the master cookie when the second cookie is received along with the request for internet access to the first website.

8. The distributed proxy server system of claim 7, wherein the additional identity information in the second cookie is removed prior to sending the future requests and the second cookie to the first website.

9. A method comprising:
   receiving a request at a proxy server system from a client web browser, the request for a first internet data to be obtained from a first website and associated with a user of the client web browser;
   determining that a user identity of the user of the client web browser is unknown to the proxy server system;
   obtaining authentication information at the proxy server system to determine the user identity;
   creating a master cookie at the proxy server system, the master cookie containing information about the user identity;
   creating a second cookie by the proxy server system, the second cookie containing information about the user identity and information for the first website;
   allowing access to the first internet data to be obtained from the first website using a portion of the second cookie, the portion of the second cookie excluding the information about the user identity;
   receiving a request for second internet data to be obtained from a second website;
   using the master cookie to create a third cookie associated with the second website without obtaining authentication information a second time, the third cookie containing information about the user identity obtained from the master cookie and information for the second website; and
   allowing access to the second internet data to be obtained from the second website using a portion of the third cookie, the portion of the third cookie excluding the information about the user identity.

10. The method of claim 9 wherein the master cookie, the second cookie and the third cookie are sent to the client web browser.

11. The method of claim 9 wherein obtaining authentication information at the proxy server system to determine the user identity comprises obtaining authentication information using an NT LAN Manager (NTLM) authentication process.

12. The method of claim 9 wherein obtaining authentication information at the proxy server system to determine the user identity comprises obtaining authentication information via the user completing a logon process.

13. The method of claim 9 wherein obtaining authentication information at the proxy server system to determine the user identity comprises obtaining authentication information using a Security Assertion Markup Language (SAML) identity provider.

14. The method of claim 9 wherein future requests to the first website are serviced using the second cookie and not the master cookie when the second cookie is received along with the future requests for first internet data to be obtained from the first website.

15. A non-transitory computer readable storage medium comprising instructions stored thereon to cause one or more processors to:

receive a request at a proxy server system from a client web browser, the request for a first internet data to be obtained from a first website and associated with a user of the client web browser;

determine that a user identity of the user of the client web browser is unknown to the proxy server system;

obtain authentication information at the proxy server system to determine the user identity;

create a master cookie at the proxy server system, the master cookie containing information about the user identity;

create a second cookie by the proxy server system, the second cookie containing information about the user identity and information for the first website;

allow access to the first internet data to be obtained from the first website using a portion of the second cookie, the portion of the second excluding the information about the user identity;

receive a request for second internet data to be obtained from a second website;

use the master cookie to create a third cookie associated with the second website without obtaining authentication information a second time, the third cookie containing both information about the user identity and information for the second website; and allow access to the second internet data to be obtained from the second website using a portion of the third cookie, the portion of the third cookie excluding the information about the user identity.

16. The non-transitory computer readable storage medium of claim 15 further comprising instructions to send the master cookie, the second cookie and the third cookie to the client web browser.

17. The non-transitory computer readable storage medium of claim 15 wherein the instructions to cause the one or more processors to obtain authentication information at the proxy server system to determine the user identity comprise instructions to cause the one or more processors to obtain authentication information using an NT LAN Manager (NTLM) authentication process.

18. The non-transitory computer readable storage medium of claim 15 wherein the instructions to cause the one or more processors to obtain authentication information at the proxy server system to determine the user identity comprise instructions to cause the one or more processors to obtain authentication information via the user completing a logon process.

19. The non-transitory computer readable storage medium of claim 15 wherein the instructions to cause the one or more processors to obtain authentication information at the proxy server system to determine the user identity comprise instructions to cause the one or more processors to obtain authentication information using a Security Assertion Markup Language (SAML) identity provider.

20. The non-transitory computer readable storage medium of claim 15 wherein future requests to the first website are serviced using the second cookie and not the master cookie when the second cookie is received along with the future requests for first internet data to be obtained from the first website.

* * * * *

UNITED STATES PATENT AND TRADEMARK OFFICE
CERTIFICATE OF CORRECTION

PATENT NO. : 8,775,619 B2
APPLICATION NO. : 12/987730
DATED : July 8, 2014
INVENTOR(S) : Sven Krasser et al.

Page 1 of 1

It is certified that error appears in the above-identified patent and that said Letters Patent is hereby corrected as shown below:

In the Claims

Column 9, line 18, in Claim 15, after "second" insert -- cookie --.

Signed and Sealed this
Twenty-fifth Day of November, 2014

Michelle K. Lee
*Deputy Director of the United States Patent and Trademark Office*